Aug. 26, 1952 J. A. MORRONE 2,608,233
TIRE ATTACHED ANTISKID DEVICE
Original Filed July 24, 1948

INVENTOR.
Joseph A. Morrone
BY

Patented Aug. 26, 1952

2,608,233

UNITED STATES PATENT OFFICE 2,608,233

TIRE ATTACHED ANTISKID DEVICE

Joseph A. Morrone, Westerly, R. I.

Original application July 24, 1948, Serial No. 40,494, now Patent No. 2,552,995, dated May 15, 1951. Divided and this application November 14, 1950, Serial No. 195,565

2 Claims. (Cl. 152—225)

1

The object of my invention is to provide a combined tire and removable anti-skid device in which coacting means along the sides of the tire tread and on both ends of the anti-skid device are provided for removably attaching the anti-skid device directly to the tire on both sides of the tread, without causing the mutilation of the tire casing.

My invention includes a tire having an annular series of spaced pairs of closely adjacent holes along each side of its tread and an elastic anti-skid device stretched across the tire tread and provided with a pair of end portions at each end of the device, said end portions having inwardly directed closely adjacent studs or rollers removably engaging a selected pair of holes in each side of the tire tread.

My invention includes more particularly an anti-skid device comprising an elastic solid portion, as rubber, and in which the end portions are of resilient material directed toward each other to bring the inwardly directed studs or rollers into close proximity.

Figure 1:
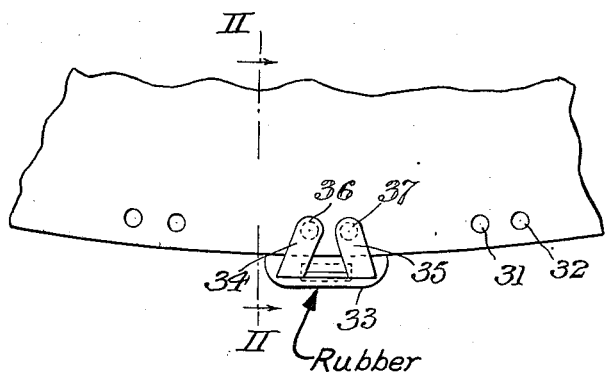
Figure 2:
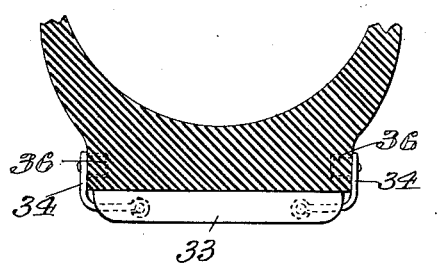

A practical embodiment of my invention is represented in the accompanying drawings, in which:

Fig. 1 represents a detail side view of a tire and an end view of its removable anti-skid device attached thereto, and Fig. 2 represents a cross-section taken in the plane of the line II—II of Fig. 1, looking in the direction of the arrows.

The tire is shown as having an annular series of spaced pairs of closely adjacent holes 31, 32 along each side of the tire tread. The anti-skid device is shown as comprising an elastic solid portion 33, as rubber, stretched across the tire tread, each end of which elastic solid portion is provided with a pair of resilient end portions 34, 35 permanently united with the said elastic solid portion 33 and having inwardly directed closely adjacent studs or rollers 36, 37 located in a selected pair of the closely adjacent holes 31, 32, along each side of the tire tread.

It will be seen from the above description that any tendency of the anti-skid device to bite into the tire is eliminated and the unintentional disengagement of the anti-skid device is prevented irrespective of the direction in which the tire is rotating.

2

It will be understood that in actual practice as many anti-skid devices may be attached to the tire as desired.

This application is a division of my copending application Serial No. 40,494, filed July 24, 1948, now Patent No. 2,552,995, issued May 15, 1951.

It is evident that various changes may be made in the construction, form and arrangement of the several parts without departing from the spirit and scope of my invention, and hence I do not intend to be limited to the particular embodiment herein shown and described.

What I claim is:

1. In combination, a tire having an annular series of spaced pairs of closely adjacent holes along each side of its tread, and an elastic anti-skid device comprising an elastic solid portion stretched across the tire tread and being provided with a pair of resilient end portions at each end of the device, said pairs of end portions having inwardly directed closely adjacent studs or rollers removably engaging a selected pair of closely adjacent holes in each side of the tire tread, to removably attach the anti-skid device to the tire on both sides of the tire tread.

2. In combination, a tire having an annular series of spaced pairs of closely adjacent holes along each side of its tread, and an elastic anti-skid device comprising an elastic solid portion stretched along the tire tread and being provided with a pair of resilient end portions directed toward each other at each end of the device, said pairs of end portions having inwardly directed closely adjacent studs or rollers removably engaging a selected pair of closely adjacent holes in each side of the tire tread, to removably attach the anti-skid device to the tire on both sides of the tire tread.

JOSEPH A. MORRONE.

REFERENCES CITED

The following references are of record in the file of this patent:

UNITED STATES PATENTS

| Number | Name | Date |
|---|---|---|
| 2,020,586 | Stetson | Nov. 12, 1935 |
| 2,078,764 | Kielmansegg | Apr. 27, 1937 |